United States Patent
Regunathan et al.

(10) Patent No.: US 10,298,315 B2
(45) Date of Patent: May 21, 2019

(54) INTERFERENCE LEVEL VARIATION MITIGATION FOR SATELLITE COMMUNICATON SYSTEMS

(71) Applicant: Hughes Network Systems, LLC, Germantown, MD (US)

(72) Inventors: Murali Regunathan, Germantown, MD (US); Yezdi Antia, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 132 days.

(21) Appl. No.: 15/639,538

(22) Filed: Jun. 30, 2017

(65) Prior Publication Data

US 2019/0007126 A1    Jan. 3, 2019

(51) Int. Cl.
| | | |
|---|---|---|
| *H04B 7/185* | (2006.01) | |
| *H04W 72/04* | (2009.01) | |
| *H04W 72/08* | (2009.01) | |
| *H04W 52/24* | (2009.01) | |
| *H04W 28/04* | (2009.01) | |

(52) U.S. Cl.
CPC ........ *H04B 7/18513* (2013.01); *H04W 28/04* (2013.01); *H04W 52/243* (2013.01); *H04W 72/0453* (2013.01); *H04W 72/082* (2013.01)

(58) Field of Classification Search
CPC ............ H04B 7/18513; H04W 52/243; H04W 72/082; H04W 72/0453
See application file for complete search history.

(56) References Cited

U.S. PATENT DOCUMENTS

| | | | |
|---|---|---|---|
| 9,578,646 B2* | 2/2017 | Vasavada | ............ H04W 72/082 |
| 2014/0087652 A1* | 3/2014 | Oh | ........................ H04B 7/2041 |
| | | | 455/9 |

FOREIGN PATENT DOCUMENTS

WO    2000035125    6/2000

OTHER PUBLICATIONS

Whitefield et al., "Spaceway Now and in the Future: On-Board IP Packet Switching Satellte Communication Network," Hughes Network Systems, LLC, Oct. 2006, pp. 1-7.
(Continued)

*Primary Examiner* — Feben Haile
(74) *Attorney, Agent, or Firm* — Fish & Richardson P.C.

(57) ABSTRACT

Methods, systems, and apparatus, including computer programs encoded on a computer storage medium, for adjusting the transmission power of satellite transceivers based on estimated interference. In some implementations, a satellite transceiver receives a data structure that specifies an interference compensation value for at least one frequency channel on which the satellite transceiver can transmit. The interference compensation value for the frequency channel is based on estimated interference imposed on satellite transmissions transmitted by the transceiver on the frequency channel. The transceiver receives data specifying a second transmit frequency channel to use for a second satellite transmission. A first interference compensation value for a first frequency channel and a second interference compensation value for the second frequency channel are identified from the data structure. The power level of the transmitter of the transceiver is adjusted based on a difference between the second interference compensation value and the first interference compensation value.

20 Claims, 6 Drawing Sheets

(56) References Cited

OTHER PUBLICATIONS

'Hughes.com' [online]."Equalization and Predistortion for Mitigation of VSAT Channel Impairments," Hughes Network Systems, LLC, Jul. 2016, 2 pages.

'Wikipedia.com' [online]. "Demand Assigned Multiple Access (DAMA)," May 2016, Retrieved from the Internet: URL< https://en.wikipedia.org/wiki/Demand_Assigned_Multiple_Access>. 2 pages.

\* cited by examiner

INTERFERENCE LEVEL VARIATION MITIGATION FOR SATELLITE COMMUNICATON SYSTEMS

BACKGROUND

In a Demand Assigned Multiple Access (DAMA) satellite communication system, communication channels are temporarily assigned to gateways and terminals. However, the amount of interference may vary based on the assigned channel. For example, one channel may be subject to more interference than another channel. This can result in a different signal-to-noise ratio (SNR) each time a terminal or gateway is assigned to a different channel.

SUMMARY

In some implementations, a satellite transceiver (e.g., a satellite terminal or gateway) can adjust its transmit power based on a channel to which the transceiver is assigned. A channel can include one or more carrier frequencies or frequency ranges, e.g., a frequency range for transmitting data and/or a frequency range for receiving data. In a DAMA satellite communication system, the transceiver may be assigned different transmit frequency channels for different satellite transmissions.

The satellite transceiver can determine an appropriate transmit power using a data structure, e.g., a table, that specifies interference compensation values for frequency channels on which the transceiver is configured to transmit. The interference compensation value for a transmit frequency channel can be based on estimated interference imposed on the transceiver's satellite transmissions using that transmit frequency channel, e.g., as determined from power, directivity, and/or other characteristics of other satellite transceivers and/or the satellite with which the transceiver is communicating. The interference compensation values can be predetermined and stored at the transceiver, allowing the transceiver to compensate for a switch between any channel in a set to any other channel in the set without requiring active analysis of current channel conditions. When the frequency channel on which the transceiver transmits is changed from a first transmit frequency channel to a second transmit frequency channel, the transceiver can adjust its transmit power based on a difference between the interference compensation value for the first transmit frequency channel and the interference compensation value for the second transmit frequency channel.

The level of interference that affects satellite transmissions may vary based on the transmit frequency channel used for the transmissions. For example, some transmit frequency channels may be used for higher symbol rate transmissions than others, which may result in more interference at those transmit frequencies. In a particular example, different portions of the frequency spectrum may be assigned as channels operating at different symbol rates. This can result in different symbol rate carriers interfering with each other in different portions of the frequency spectrum and therefore different combined interference at the different portions of the frequency spectrum, as well as different SNR requirements for using the channels operating at different symbol rates. In addition, some transmit frequency channels may have more interferers (e.g., more terminals and gateways that transmit on the frequency channels) than other frequency channels.

The techniques described below allow a satellite transceiver to adjust its power based on the estimated interference level so that the transceiver can maintain the same (or similar) signal quality across the various frequency channels. This results in higher quality signals, reduced packet error rates, and less interference imposed on other signals due to transmitting data at higher transmit power levels than required for a transmit frequency channel.

By estimating the level of interference for each transmit frequency channel based on power, directivity, and/or other characteristics of other satellite transceivers and/or the satellite with which the transceiver is communicating, the amount of computing resources used to estimate the levels of interference can be reduced. In some implementations, a transceiver can perform a ranging operation using a first frequency channel to determine a transmit power level for the first frequency channel. This ranging operation usually involves transmitting data using the first frequency channel, receiving signal quality data for each transmission, and adjusting the transmit power until the signal quality meets a signal quality target. Thereafter, the ranging operation is not needed for transmissions on other channels. Using a table of interference compensation values to adjust the transmit power for other frequencies avoids the need to range the transceiver using the other frequency channels. This reduces the amount of bandwidth consumed in determining transmit power levels for transceivers and reduces the amount of computing resources and satellite communication resources used in determining the power levels. By limiting the amount of transmissions used for ranging, e.g., to a single channel at the beginning of a communication session, the interference typically caused by frequent ranging is significantly reduced. In addition, by setting the transmit power levels appropriately, the system avoids transmitting with excessive power, which wastes energy and causes unnecessary interference for other transceivers, while also avoiding transmitting with insufficient power, which could result in high error rates or data loss.

By using a table of interference compensation values to determine adjustments to transmit power levels, the table can be stored at the transceiver without consuming a significant amount of memory. The table also allows the transceiver to adjust its transmit power level in response to a transmit frequency change quickly using minimal computing resources. The table can be updated quickly, e.g., by a gateway, if the satellite system layout has changed, e.g., a new gateway or terminal is added to the satellite system.

In one general aspect, the techniques disclosed herein describe methods of adjusting transmission power. According to some of the methods, a satellite transceiver receives a data structure that specifies an interference compensation value for at least one transmit frequency channel of a set of frequency channels on which the satellite transceiver is configured to transmit. The interference compensation value for the at least one transmit frequency channel is based on estimated interference imposed on satellite transmissions transmitted by the satellite transceiver on the at least one transmit frequency channel. The satellite transceiver receives data specifying a second transmit frequency channel associated with a second satellite transmission. In response to receiving the data specifying the second transmit frequency channel, a transmit frequency channel of a transmitter of the satellite transceiver is adjusted from a first transmit frequency channel to the second transmit frequency channel. A first interference compensation value for the first transmit frequency channel and a second interference compensation value for the second transmit frequency channel are identified from the received data structure. A transmit power level of the transmitter of the satellite transceiver is adjusted based on a difference between the second interference compensation value and the first interference compensation value. The satellite transceiver transmits data at the adjusted transmit power level and on the second transmit frequency channel.

In some implementations, adjusting the transmit power of the transmitter of the satellite transceiver includes determining, as the adjusted transmit power, a sum of (i) a first transmit power level used by the transmitter of the satellite transceiver for a first data transmission using the first transmit frequency channel and (ii) the difference between the second interference compensation value and the first interference compensation value.

In some implementations, the interference compensation value for the at least one transmit frequency channel is based on an estimated total path signal-to-noise ratio for the at least one transmit frequency channel. The total path includes a first signal from the satellite transceiver to a satellite on the at least one transmit frequency channel and a second signal from the satellite to a second satellite transceiver different from the satellite transceiver.

In some implementations, the satellite transceiver includes a satellite terminal and the second satellite transceiver includes a satellite gateway. In these implementation, the first signal can include a return uplink signal and the second signal can include a return downlink signal.

In some implementations, the satellite transceiver includes a satellite gateway and the second satellite transceiver includes a satellite terminal. In these implementations, the first signal can include a forward uplink signal and the second signal comprises a forward downlink signal.

In some implementations, the interference compensation value for the at least one transmit frequency channel is based on a difference between (i) an estimated total path signal-to-noise ratio for any one frequency channel of the set of frequency channels and (ii) the estimated total path signal-to-noise ratio for the at least one transmit frequency channel.

In some implementations, the estimated total path signal-to-noise ratio for the at least one transmit frequency channel is based on estimated interference imposed on signals transmitted by the satellite transceiver on the at least one transmit frequency channel by one or more satellite gateways that transmit on the at least one transmit frequency channel and one or more satellite terminals that transmit on the at least one transmit frequency channel.

In some implementations, the estimated interference imposed on signals transmitted by the satellite transceiver on the at least one transmit frequency channel by one or more satellite gateways and one or more satellite terminals is based on, for each satellite gateway, a directional power of the satellite gateway and directivity of an antenna of the satellite at a location of the satellite gateway. The estimated interference imposed on signals transmitted by the satellite transceiver can be also be based on, for each different satellite terminal, a directional power of the satellite terminal and directivity of an antenna of the satellite at a location of the satellite terminal.

In some implementations, the estimated interference imposed on signals transmitted by the satellite transceiver on the at least one transmit frequency channel by one or more a satellite gateways and one or more different satellite terminals is based on, for each satellite gateway, performance data for an antenna of the satellite gateway and directivity of an antenna of the satellite. The estimated interference imposed on signals transmitted by the satellite transceiver can also be based on, for each different satellite terminal, performance data for an antenna of the different satellite terminal and directivity of an antenna of the satellite.

Some implementations include receiving updated interference compensation values and using the updated interference compensation values to adjust the transmit power of the transmitter of the satellite transceiver. The updated interference compensation values can be based on a change to a satellite system that includes the satellite transceiver. The change to the satellite system can include an addition or removal of at least one of (i) a satellite terminal, (ii) a satellite gateway, or (iii) a portion of the channels of which signals are being transmitted by terminals or gateways of the satellite system.

In one general aspect, the techniques disclosed herein describe methods of generating data structures that include interference compensation values. According to some of the methods, one or more computers receive an antenna profile for a satellite. The antenna profile represents a power level of satellite signals at multiple locations. The one or more computers receive, for each of one or more satellite terminals, data representing transmit power of the satellite terminal at each frequency channel of a set of frequency channels on which a particular satellite transceiver is configured to transmit. The one or more computers receive, or each of one or more satellite gateways, data representing transmit power of the satellite gateway at each frequency channel of the set of frequency channels. The one or more computers determine, for at least one frequency channel of the set of frequency channels, an estimated signal-to-noise ratio for the particular satellite transceiver when the particular satellite transceiver transmits at the frequency channel based on the antenna profile for the satellite, the data received for each satellite terminal and the data received for each satellite gateway. The one or more computers generate a data structure that specifies, for the at least one frequency channel of the set of frequency channels, an interference compensation value for the at least one frequency channel. The interference compensation value for the at least one frequency channel is based on a difference between the signal-to-noise ratio for a particular frequency channel of the set of frequency channels and the signal-to-noise ratio for the at least one frequency channel. The data structure is provided to the particular satellite transceiver.

In some implementations, the particular frequency channel is the frequency channel of the set of frequency channels having the greatest signal-to-noise ratio of the set of frequency channels.

In some implementations, the estimated signal-to-noise ratio for the particular satellite transceiver when the particular satellite transceiver transmits at each particular frequency channel is further based on a location of each of the one or more satellite terminals and a location of each of the one or more satellite gateways.

In some implementations, the estimated signal-to-noise ratio for the particular satellite transceiver when the particular satellite transceiver transmits at each particular frequency channel is further based on performance data for a respective antenna of each of the one or more satellite terminals and performance data for a respective antenna of each of the one or more satellite gateways.

In some implementations, the signal-to-noise ratio for the particular frequency channel is the signal-to-noise ratio for a frequency channel having the highest signal-to-noise ratio of the set of frequency channels. In some implementations, the particular satellite transceiver is one of a satellite terminal or a satellite gateway.

Other embodiments include corresponding systems, apparatus, and software programs, configured to perform the actions of the methods, encoded on computer storage devices. For example, some embodiments include a satellite terminal and/or a satellite gateway configured to perform the actions of the methods. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
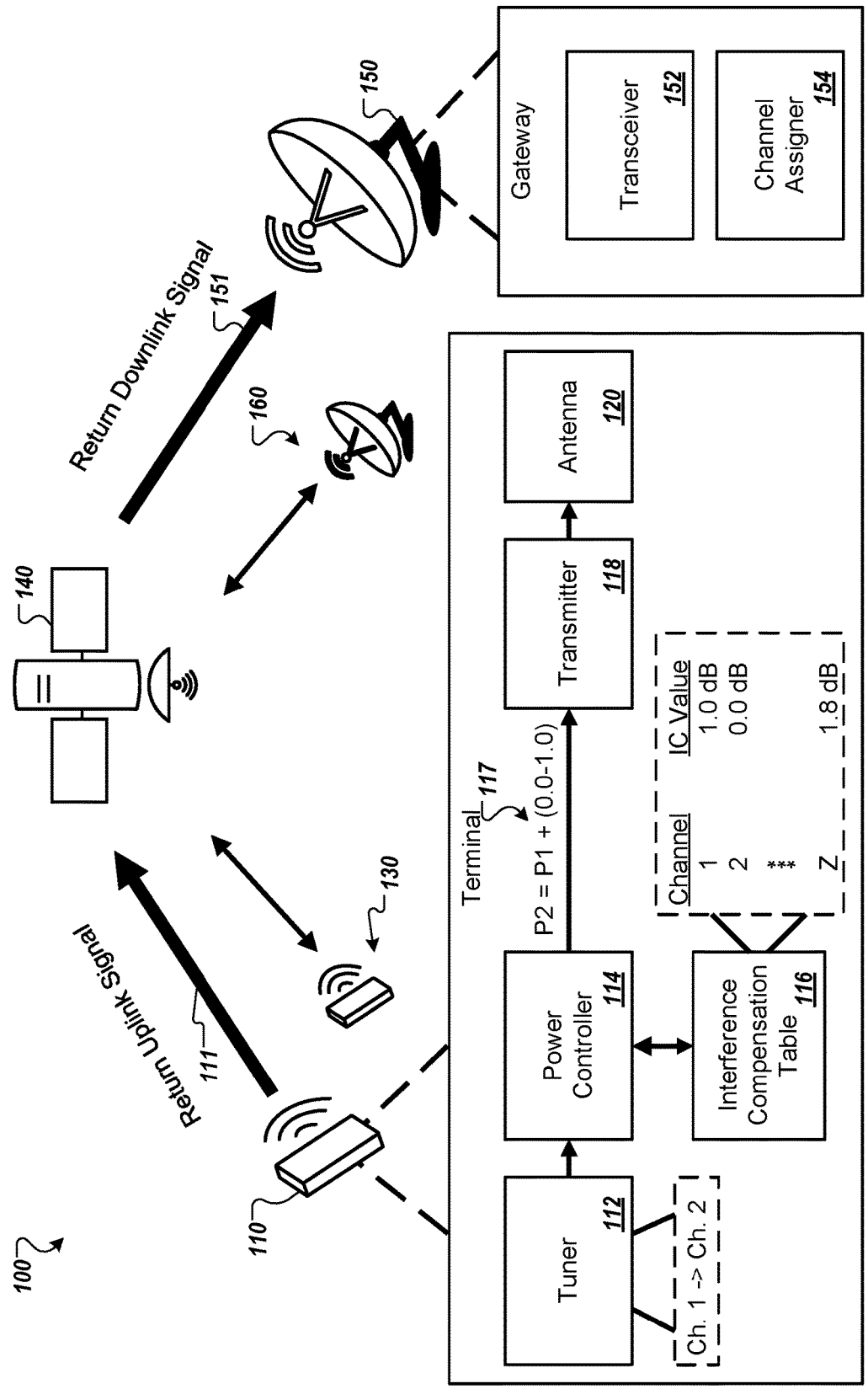
FIG. 1 is a diagram that illustrates an example of a system in which a satellite terminal adjusts its transmit power level based on transmit frequency channel.

FIG. 1 is a diagram that illustrates an example of a system 100 in which a satellite terminal 110 adjusts its transmit power level based on transmit frequency channel. The system 100 includes a satellite 140 of a satellite network that can include multiple satellites, and a gateway 150. The terminal 110 can communicate with the gateway 150 by transmitting data in a return uplink signal 111 to the satellite 140. The satellite 140 can transmit the data to the gateway 150 in a return downlink signal 151. The gateway 150 can also send data to the terminal 110 by transmitting the data in a forward uplink signal to the satellite 140. The satellite 140 can transmit the data to the terminal 110 in a forward downlink signal to the terminal 110.

The system 100 can also include one or more additional terminals 130 and one or more additional gateways 160 that transmit and/or receive signals that impose interference on the return uplink signal 111 and/or the return downlink signal 151, as described in more detail below with reference to FIGS. 2 and 3. For example, the terminals 130 and gateways 160 may transmit and/or receive signals using one or more transmit communication channels that are also used by the terminal 110.

The gateway 150 includes a satellite transceiver 152 and a channel assigner 154. The transceiver 152 can transmit signals to the satellite 140 and receive signals from the satellite 140. The channel assigner 154 can assign transmit frequency channels to terminals, such as the terminal 110 and/or the terminals 130. For example, the gateway 150 may use DAMA technology to assign transmit frequency channels to the terminals. Similarly, the terminal 110 can be configured to transmit data at multiple transmit frequency channels.

The channel assigner 154 can receive a request for a channel assignment from the terminal 110 and assign a transmit frequency channel to the terminal 110 in response to the request. For example, the terminal 110 can submit a request to the gateway 150 for each data transmission by the terminal 110. The transceiver 152 can transmit the assigned transmit frequency channel to the terminal 110 via the satellite 140. In turn, the terminal 110 can transmit data in a return uplink signal 111 using the assigned transmit frequency channel.

The terminal 110 includes a tuner 112, a power controller 114, an interference compensation data table 116, a transmitter 118, and an antenna 120. The tuner 112 can adjust the transmit frequency channel used by the terminal 110 to transmit data. For example, as described above, the terminal 110 can be configured to transmit data using multiple transmit frequency channels. The tuner 112 can switch the terminal between the multiple transmit frequency channels, e.g., based on an assigned transmit frequency channel received from the gateway 150.

The power controller 114 can set a transmit power level of the transmitter 118 for a particular data transmission. The power controller 114 can set the transmit power level based on the assigned transmit frequency channel for the data transmission. As described above, the level of interference may vary based on transmit frequency channel. To ensure high signal quality, e.g. greater than a threshold SNR, the power controller 114 can adjust the transmit power level based on an expected level of interference for the transmit frequency channel.

In some implementations, the power controller 114 adjusts the transmit power level based on interference compensation values stored in the interference compensation table 116. Although in this example the interference compensation values are stored in a table, the interference compensation values can be stored in other data structures, e.g., databases, registers, etc. The interference compensation table 116 includes an interference compensation value for each of one or more transmit frequency channels on which the terminal 110 transmits data. For example, the terminal 110 is configured to transmit on "Z" transmit frequency channels, where "Z" is an integer greater than two but could be an integer greater than one in other examples. The interference compensation values can be pre-calculated by one or more computers, e.g., by the interference compensation table generator 410 of FIG. 4, and provided to the terminal 110.

The interference compensation value for a transmit frequency channel can be based on estimated interference imposed on satellite transmissions transmitted by the terminal 110 on the transmit frequency channel. In some implementations, the interference compensation value for a transmit frequency channel is based on an estimated interference imposed on the total path from the terminal 110 to the gateway 150 for the transmit frequency channel. The estimated interference along the total path for a transmit frequency channel can be based on a combination of the estimated interference imposed on the return uplink signal 111 and the estimated interference imposed on the downlink signal 151, as described in more detail below.

In some implementations, the interference compensation value for a transmit frequency channel is based on the estimated total path SNR of the communication path from the terminal 110 to the gateway 150 for the transmit frequency channel. The estimated total path SNR for the transmit frequency channel can be based on a combination of the estimated SNR of the return uplink signal 111 and the estimated SNR of the return downlink signal 151. The estimated total path SNR for each transmit frequency channel can be expressed in decibels.

In some implementations, the interference compensation values are normalizations of the estimated total path interference or the estimated total path SNRs that are based on the estimated total path interference to make power adjustments for channel changes quicker and less computationally intensive. For example, the estimated total path SNRs can be normalized using the estimated total path SNR for one of the transmit frequency channels. In a particular example, the interference compensation value for each particular transmit frequency channel is based on a difference between the highest estimated total path SNR of the transmit frequency channels and the total path SNR for the particular transmit frequency channel. In this way, the interference compensation value for the transmit frequency channel having the highest estimated total path SNR would be zero and the interference compensation value for each other transmit frequency channel that has a lower estimated total path SNR would be some number greater than zero. This results in each interference compensation value for the transmit frequency channels having a lower estimated total path SNR having a positive value that can be used to increase the transmit power level for these transmit frequency channels. Example techniques for determining interference compensation values are described in more detail below.

When the tuner 112 changes the transmit frequency from one transmit frequency channel to another transmit frequency channel (e.g. from a first transmit frequency channel to a second transmit frequency channel), the power controller 114 can adjust the transmit power of the transmitter 118 using the interference compensation values stored in the interference compensation table 116. The adjusted power level is based on a first power level used for a first transmission on the first transmit frequency channel, the interference compensation value for the first transmit frequency channel, and the interference compensation value for the second transmit frequency channel. In some implementations, the adjusted power level is based on the first power level used for the first transmission on the first transmit frequency channel and a difference between the interference compensation value for the first transmit frequency channel and the interference compensation value for the second transmit frequency channel.

The first and second transmissions can be in any sequence. For example, the second transmission on the second transmit frequency channel can occur after the first transmission on the first transmit frequency channel. The second transmission may be immediately after the first transmission (e.g., no intervening transmissions by the transceiver) or there may be one or more intervening transmissions between the first transmission and the second transmission. For example, the transceiver can transmit a first transmission on the first transmit frequency channel. Later, the transceiver can transmit a second transmission on the second transmit frequency channel. Between the first and second transmissions, the transceiver may use zero or more other transmit frequency channels to transmit data. Thus, the first transmission may be referred to as a previous transmission on a previous transmit frequency channel and the second transmission may be referred to as a next transmission on a next transmit frequency channel.

For example, the interference compensation value for channel 1 is 1.0 decibels (dB) and the interference compensation value for channel 2 is 0.0 dB. In this example, consider that channel 2 had the highest total path SNR resulting in the interference compensation value of 0.0 dB and that the total path SNR for channel 1 was lower (e.g., 1.0 dB lower) than the total path SNR for channel 2. Thus, in this example, channel 1 receives more interference than channel 2. If the tuner 112 changes the transmit frequency channel from channel 1 to channel 2, the power controller 114 can determine the transmit power level for the transmission on channel 2 using equation 117. In equation 117, the transmit power level for the transmission on channel 2 is a sum of the transmit power level for the previous transmission of channel 1 and the difference between the interference compensation value for channel 2 (0.0 dB) and the interference compensation value for channel 1 (1.0 dB). As the difference is a negative number (−1.0), this may result in a decrease in transmit power for channel 2 relative to channel 1 as channel 2 has a higher SNR than channel 1 and therefore needs less transmit power to have a sufficient SNR. For example, the adjusted transmit power level may be 1.0 dB less than the transmit power level for the previous transmission.

The power controller 114 can determine a transmit power level each time the tuner 112 changes the transmit frequency channel and provide data specifying the power level to the transmitter 118 so that the transmitter 118 transmits data at the appropriate power level for the transmit frequency channel. In some implementations, the power controller 114 can also adjust the power level based on other factors, such as weather, cross-talk from other channels, etc. For example, the power controller 114 can adjust the transmit power based on transmit frequency channel using the interference compensation values and adjust the transmit power based on weather and/or other factors.

The transmitter 118 can transmit data using the antenna 120 based on the transmit power level determined by the power controller 114 and on the transmit frequency channel set by the tuner 112. Although not shown, the terminal 110 can also include a receiver that receives data from the gateway 150. For example, the terminal 110 can include a satellite transceiver that includes the transmitter 118 and a receiver.

In some implementations, the terminal 110 can perform a ranging process to determine an appropriate power level for a particular transmit frequency channel. During the ranging process, the terminal 110 can transmit data to the gateway 150 and receive signal quality indicators based on the transmissions. The terminal 110 can adjust the power level for the particular transmit frequency channel until the signal quality indicators indicate that the signal quality is within a threshold amount of a target signal quality. Rather than performing the ranging process for each transmit frequency channel, the terminal 110 can use the interference compensation values to adjust the power level of the transmitter 118 for other transmit frequency channels. For example, some satellite systems would perform ranging for every channel which uses much more power, bandwidth, and causes interference. Using the interference compensation values as described herein allows for ranging to be performed for one channel, reducing consumption of power, bandwidth and interference.

In some implementations, when a terminal 110 is placed into service or initialized, the terminal 110 can be turned on and the terminal 110 can perform the ranging process for one of its transmit frequency channels. As described above, the terminal 110 can transmit data to the gateway 150, receive signal quality indicators based on the transmissions, and adjust the power level for the transmit frequency channel until the signal quality indicators indicate that the signal quality is within a threshold amount of a target signal quality to perform the ranging process. The terminals 110 can also receive, e.g., from the gateway 150, a data structure that includes interference compensation values for the terminal 110.

When the terminal 110 is ready to transmit data, the terminal 110 can request a channel assignment from the gateway 150. The terminal 110 can receive the channel assignment from the gateway 150 and determine a transmit power level for the assigned channel based on the power level determined for the one frequency channel during the ranging process and interference compensation values for the one frequency channel and the assigned channel. For example, the terminal 110 can adjust the power level from the power level of the one frequency channel to an appropriate power level for the assigned channel based on a difference between the interference compensation value for the assigned channel and the interference compensation value for the one channel. The terminal can then transmit data on the assigned channel at the adjusted power level.

Although not shown, the gateway 150 can include an interference compensation table and a power controller similar to the interference compensation table 116 and the power controller 114, respectively. The transceiver 152 can adjust the power of forward uplink signals transmitted from the gateway 150 to the satellite based on interference compensation values determined for each transmit frequency channel of the gateway 150. The interference compensation value for each transmit frequency channel of the gateway 150 can be determined based on estimated amounts of interference imposed on forward uplink signals transmitted from the gateway 150 to the satellite 140 using the transmit frequency channel and forward downlink signals transmitted from the satellite to the terminal 110 using the transmit frequency channel.

Similar to the interference compensation values for the terminal 110, the interference compensation value for a transmit frequency channel of the gateway can be based on a normalization of the estimated total path SNR of the communication path from the gateway 150 to the terminal 110 for the transmit frequency channel. The estimated total path SNR for the transmit frequency channel can be based on a combination of the estimated SNR of the forward uplink signal and the estimated SNR of the forward downlink signal, e.g., expressed in decibels. The normalization can be based on the SNR for one of the transmit frequency channels of the gateway 150, e.g., the highest SNR, similar to that of the interference compensation value normalization for the terminal 110.

The gateway 150 can also perform a ranging process to determine an appropriate transmit power level for one of the transmit frequency channels and then use the transmit power level for the one transmit frequency channel and the interference compensation values for the frequency channels to adjust the transmit power level for each transmit frequency channel. For example, when the gateway 150 adjusts its transmit frequency channel from a first frequency channel to a second frequency channel, the gateway 1150 can determine an adjusted power level for the second frequency channel based on a first power level used for the first transmission on the first frequency channel and a difference between the interference compensation value for the first frequency channel and the interference compensation value for the second frequency channel, as described above for the terminal 110.

The gateway 150 can store an interference compensation table for each terminal with which the gateway 150 communicates. For example, the gateway 150 may communicate with terminals in different locations that are affected differently by interference and therefore have different interference compensation values for the different frequency channels of the gateway 150. Similarly, if a terminal communicates with multiple gateways, the terminal can store an interference compensation table for each gateway and use the interference compensation table for the gateway with which the terminal is communicating.

Figure 2:
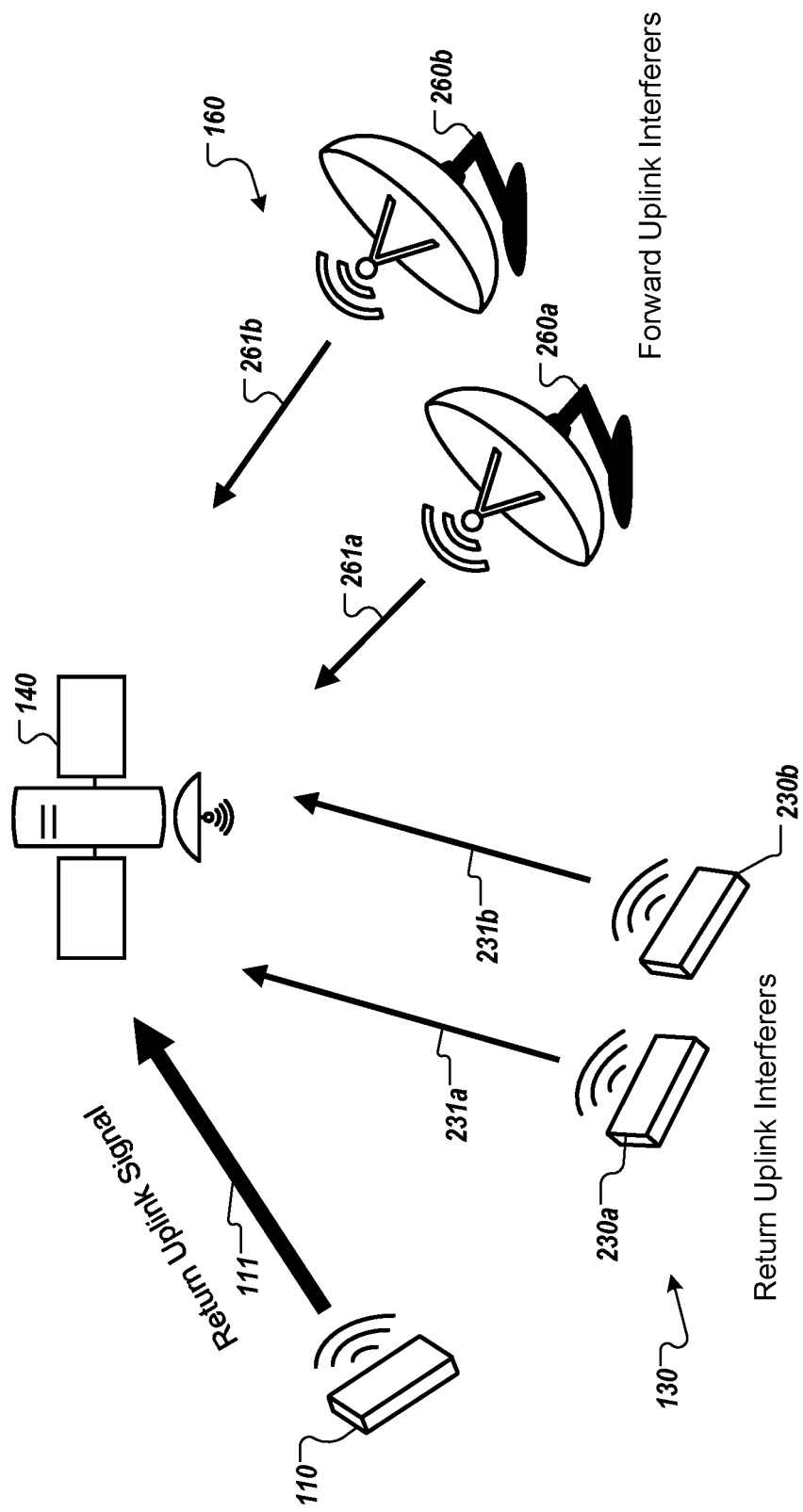
FIG. 2 is a diagram that illustrates example interferers that impose interference on a return uplink signal transmitted by a satellite terminal.

FIG. 2 is a diagram that illustrates example interferers that impose interference on the return uplink signal 111 transmitted by the satellite terminal 110. The interferers include other satellite terminals 230a and 230b and other satellite gateways 260a and 260b. Although two terminals 230a and 230b and two gateways 260a and 260b are illustrated in FIG. 2, other numbers of terminals and gateways may impose interference on signals communicated between the terminal 110 and the gateway 150.

Data transmissions by the terminals 230a and 230b can impose interference on return uplink signals transmitted by the terminal 110. For example, the terminal 110 may transmit data to the satellite 140 on a first spot beam from a first location. The terminal 230a may transmit data to the satellite 140 (or another satellite) on a second spot beam 231a from a second location and the terminal 230b may transmit data to the satellite 140 (or another satellite) on a third spot beam 231b from a third location. If each terminal transmits on the same frequency channel at the same time, the terminals may impose interference on each other's transmitted signals.

The amount of interference imposed on a terminal's transmitted signal for each transmit frequency channel may depend on the relative location of the terminals, the transmit power of the terminals, the directional power of the terminals, the performance of the terminals' antennas, the bandwidth of the transmitted signals, the roll-off and polarization of the transmitted signals, and/or the directivity pattern of the satellite 140. For example, two terminals that are close together may impose more interference on each other than two terminals that are further apart. Example techniques for determining the amount of interference imposed by each interfering terminal and for each transmit frequency channel are described in detail below.

The terminals that impose interference on data transmissions of the terminal 110 can vary based on the transmit frequency channel of the terminal 110. For example, a first set of terminals may each be configured to transmit on a first transmit frequency channel on which the terminal 110 transmits. A second set of terminals may each be configured to transmit on a second transmit frequency channel on which the terminal 110 transmits. One or more terminals in the first set may not be members of the second set. Similarly, one or more terminals in the second set may not be members of the first set. Thus, data transmissions on the first transmit frequency channel may have different interferers than data transmissions on the second transmit frequency channel.

Similarly, data transmissions by the gateways 260a and 260b can also impose interference on return uplink signals transmitted by the terminal 110. For example, the terminal 110 may transmit data to the satellite 140 on a first spot beam from a first location. The gateway 260a may transmit data to the satellite 140 (or another satellite) on a second spot beam 261a from a second location and the terminal 260b may transmit data to the satellite 140 (or another satellite) on a third spot beam 261b from a third location. If each gateway transmits on the same frequency channel as the terminal 100 at the same time, the gateways may impose interference on the terminal's transmitted signals.

The amount of interference imposed on a terminal's transmitted signal for each transmit frequency channel may depend on the relative location of the gateways 261a and 261b and the terminal 110, the transmit power of the gateways 260a and 260b, the directional power of the gateways 260a and 260b, the performance of the gateways' antennas the bandwidth of the transmitted signals, the roll-off and polarization of the transmitted signals, and/or the directivity pattern of the satellite 140. Example techniques for determining the amount of interference imposed by each interfering gateway and for each transmit frequency channel are described in detail below.

Similar to the terminals, the gateways that impose interference on data transmissions of the terminal 110 can vary based on the transmit frequency channel of the terminal 110. For example, data transmissions on a first transmit frequency channel may have different gateways interferers than data transmissions on a second transmit frequency channel. Similarly, the terminals 230a and 230b and the gateways 261a and 261b can impose interference on forward uplink signals transmitted by the gateway 150 to the satellite 140.

Figure 3:
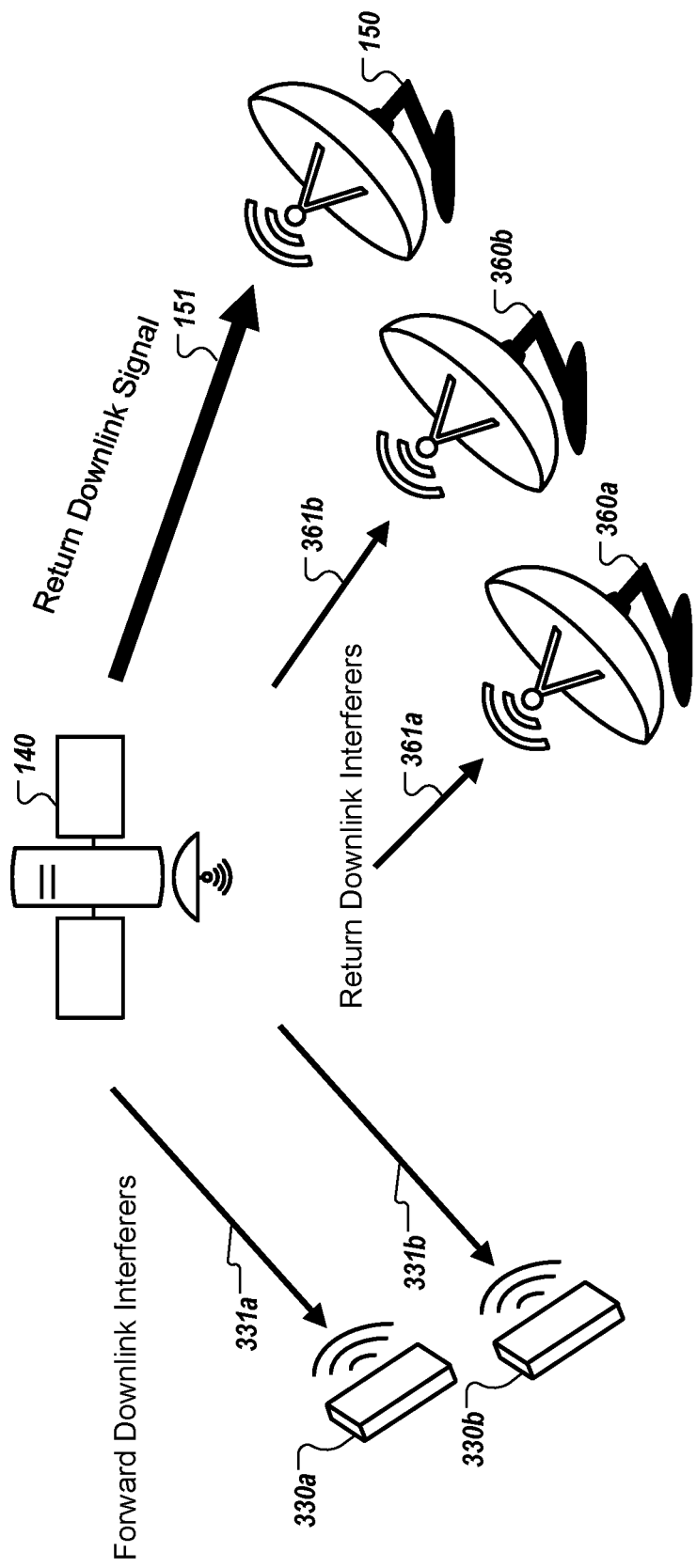
FIG. 3 is a diagram that illustrates example interferers that impose interference on a return downlink signal transmitted by a satellite to a gateway.

FIG. 3 is a diagram that illustrates example interferers that impose interference on the return downlink signal 151 transmitted by the satellite 140 to the gateway 150. The interferers include signals transmitted from the satellite 140 to other satellite terminals 330a and 330b and other satellite gateways 360a and 360b. Although two terminals 330a and 330b and two gateways 360a and 360b are illustrated in FIG. 3, signals transmitted from the satellite 140 to other numbers of terminals and gateways may impose interference on signals communicated between the satellite 140 and the gateway 150.

Data transmissions from the satellite 140 to the terminals 330a and 330b can impose interference on return downlink signals transmitted by the satellite 140 to the gateway 150. For example, the satellite 140 may transmit data on a first spot beam to the gateway 150 located at a first location. The satellite 140 may transmit data on a second spot beam 331a to the terminal 330a located at a second location and the satellite 140 may transmit data on a third spot beam 331b to the terminal 330b located at a third location. If the satellite 140 transmits the data to each terminal on the same frequency channel at the same time, the terminals may impose interference on each other's received signals.

The amount of interference imposed on return downlink signal 151 for each frequency channel may depend on the relative location of the terminals, the bandwidth of the transmitted signals, the directional power of the terminals, the performance of the terminals' antennas, the roll-off and polarization of the transmitted signals, and/or the directivity pattern of the satellite 140. Example techniques for determining the amount of interference imposed by each interfering terminal and for each transmit frequency channel are described in detail below.

The terminals for which satellite transmissions impose interference on return downlink signal 151 vary based on the frequency channel of the downlink signal 151. For example, a first set of terminals may each be configured to receive on a first frequency channel on which the satellite 140 transmits the return downlink signals 151. A second set of terminals may each be configured to receive on a second frequency channel on which the satellite 140 transmits the return downlink signals 151. One or more terminals in the first set may not be members of the second set. Similarly, one or more terminals in the second set may not be members of the first set. Thus, return downlink signals 151 on the first frequency channel may have different interferers than return downlink signals 151 on the second frequency channel.

Similarly, data transmissions from the satellite 140 to the gateways 360a and 360b can also impose interference on return downlink signals 151 transmitted by the satellite 140. For example, the satellite 140 may transmit data on a first spot beam to the gateway 150 located at a first location. The satellite 140 may transmit data on a second spot beam 361a to the gateway 360a located at a second location and the satellite 140 may transmit data on a third spot beam 361b to the gateway 360b located at a third location. If the satellite 140 transmits the data to each gateway on the same frequency channel at the same time, the terminals may impose interference on each other's received signals.

The amount of interference imposed on return downlink signal 151 for each frequency channel may depend on the relative location of the gateways, the bandwidth of the transmitted signals, the directional power of the gateways, the performance of the gateways' antennas the roll-off and polarization of the transmitted signals, and/or the directivity pattern of the satellite 140. Example techniques for determining the amount of interference imposed by each interfering gateway and for each frequency channel of the return downlink signal 151 are described in detail below.

Similar to the terminals, the gateways for which satellite transmissions impose interference on return downlink signals 151 can vary based on the transmit frequency channel of the satellite 140. For example, data transmissions on a first transmit frequency channel may have different gateways interferers than data transmissions on a second transmit frequency channel.

Figure 4:
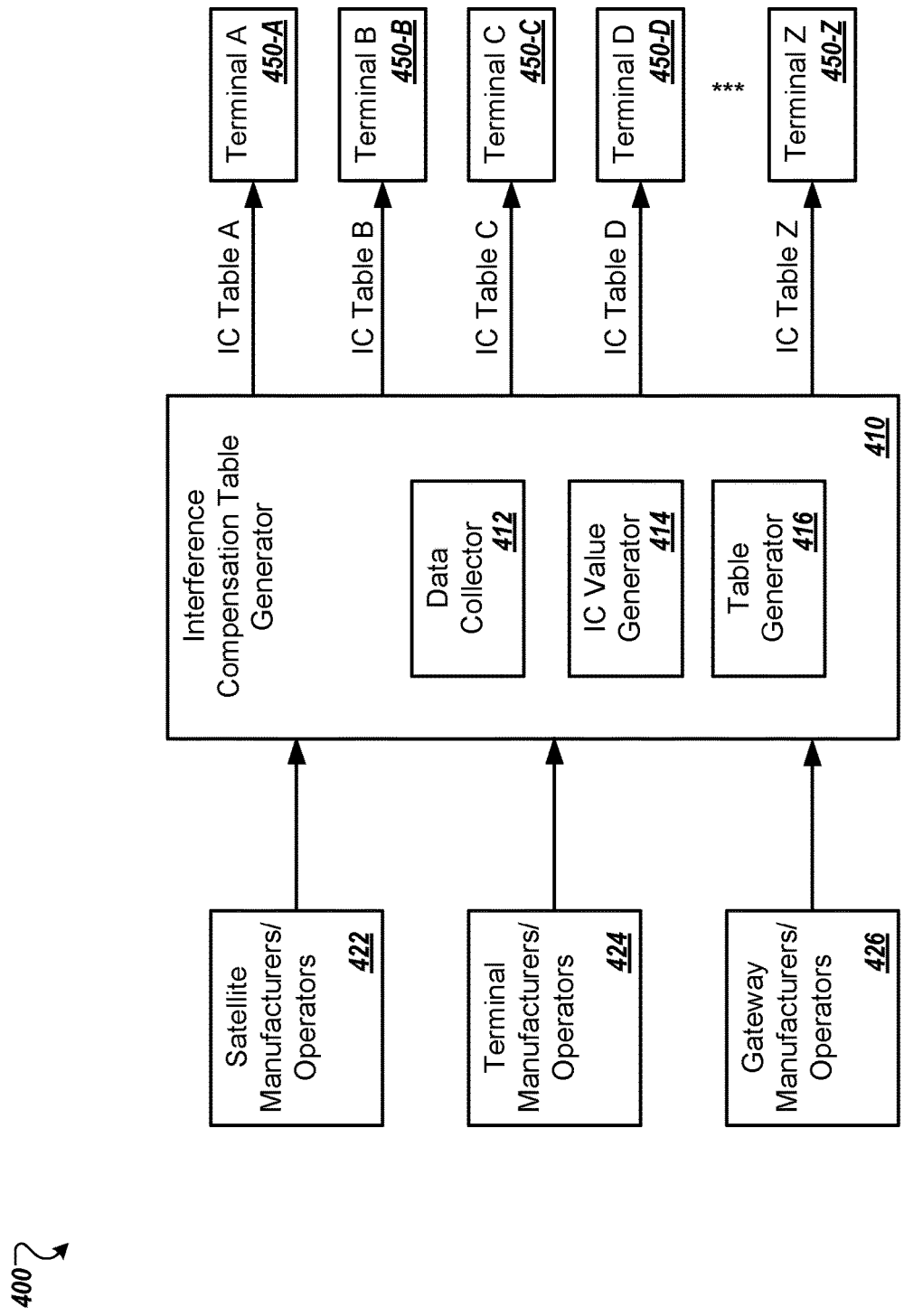
FIG. 4 is a diagram that illustrates an example of a system that determines interference compensation values for terminals and generates tables that include the values.

FIG. 4 is a diagram that illustrates an example of a system 400 that determines interference compensation values for terminals and generates tables that include the values. The system 400 includes an interference compensation table generator 410 that generates interference compensation tables for the terminals based on data received from satellite manufacturers and/or operators 422, terminal manufacturers and/or operators 424 and/or gateway manufacturers and/or operators 426.

The interference compensation table generator 410 can include one or more computers that include a data collector 412, an interference compensation value generator 414, and a table generator 416. The data collector 412 can aggregate data received from the satellite manufacturers/operators 422, terminal manufacturers/operators 424 and/or gateway manufacturers/operators 426.

The data collector 412 can receive, e.g., from data published or provided by a satellite manufacturer/operator 422, data about a satellite that communicates with terminals 450-A-450-Z for which interference compensation tables are generated. In some implementations, a user of the interference compensation table generator 410 may provide the data to the data collector 412. The data can include data specifying uplink and downlink frequency channels used by the satellite, one or more antenna profiles for the satellite, and/or noise performance of the satellite's receiver. An antenna profile can include, for each frequency channel of the satellite's uplink and downlink, an antenna pattern for the satellite's antenna at that frequency channel. The antenna pattern for a particular frequency channel can include a directivity pattern that indicates the power of satellite signals at locations within an area of interest for the satellite.

The data collector 412 can receive, e.g., from data published or provided by a terminal manufacturer/operator 424, data about a satellite terminal manufactured or operated by the terminal manufacturer/operator 424. In some implementations, a user of the interference compensation table generator 410 may provide the data to the data collector 412. The data about a satellite terminal can include the geographic location of the terminal, the frequency channels on which the terminal transmits and/or receives data, data specifying the directional power of the terminal when the terminal is transmitting data, and/or performance data for the terminal's antenna. In some implementations, the directional power of the terminal may be expressed as the Equivalent Isotropically Radiated Power (EIRP) of the terminal. In some implementations, the performance data for the terminal's antenna is expressed as the gain-to-noise-temperature (G/T) of the antenna.

The data collector 412 can receive, e.g., from data published or provided by a gateway manufacturer/operator 426, data about a satellite gateway manufactured or operated by the gateway manufacturer/operator 426. In some implementations, a user of the interference compensation table generator 410 may provide the data to the data collector 412. The data about a satellite gateway can include the geographic location of the gateway, the frequency channels on which the gateway transmits and/or receives data, data specifying the directional power of the gateway when the gateway is transmitting data, and/or performance data for the gateway's antenna. In some implementations, the directional power of the gateway may be expressed as the EIRP of the gateway. In some implementations, the performance data for the gateway's antenna is expressed as the G/T of the antenna.

The data collector 412 can also receive data about the current configuration of the satellite system. The configuration of the satellite system may identify the gateways and terminals in the system, their locations, which of the satellite's uplink and downlink frequency channels that are being used, the frequency channels being used by each terminal and gateway in the system, the symbol rate, roll-off and placement of carriers in those frequency channels, and/or other data about the satellite system.

The interference compensation value generator 414 can use the data collected by the data collector 414 to generate interference compensation values for each terminal 450-A-450-B. The interference compensation values for each particular terminal can include an interference compensation value for each channel on which the terminal transmits data.

To determine the interference compensation values for a particular terminal, e.g., terminal A 450-A, the interference compensation value generator 414 can identify the transmit frequency channels on which the terminal 450-A transmits data, e.g., based on data received from the manufacturer or operator of the terminal 450-A. For each transmit frequency channel, the interference compensation value generator 414 can identify the return uplink interferers and the return downlink interferers for that transmit frequency channel.

The return uplink interferers for a transmit frequency channel can include other terminals and gateways that can transmit data on the transmit frequency channel, as shown in FIG. 2. The return downlink interferers for a transmit frequency channel can include satellite transmissions to other terminals and gateways that can receive data on the transmit frequency channel, as shown in FIG. 3. The interference compensation value generator 414 can identify the interferers for the terminal 450-A based on the data specifying the frequency channels on which the terminals and gateways transmit and/or receive data received from the terminal manufacturers/operators 424 and the gateway manufacturers/operators 426. For example, the interference compensation value generator 414 can evaluate the data to identify each terminal and gateway that includes, as one of its channels, the transmit frequency channel of interest.

In some implementations, the interference compensation value generator 414 can also use the data about the current configuration of the satellite system to identify the interferers. For example, although a terminal may transmit data on the transmit frequency channel, the terminal may be configured to not use that channel in the current configuration of the satellite system. In this example, the terminal may not be identified as an interferer.

The interference compensation value generator 414 can then identify, for each interferer, an estimated amount of interference imposed on the return uplink signal transmitted by the terminal 450-A to the satellite and/or an estimated amount of interference imposed on the return downlink signal transmitted by the satellite to the gateway by the interferer using the data collected by the data collector 412.

For the return uplink signal transmitted by the terminal 450-A, the amount of interference imposed by each interfering terminal or interfering gateway can be based on the directional power of the transmitter of the interfering terminal or interfering gateway (e.g., the EIRP of the terminal or gateway), the directivity of the satellite receive antenna at the location of the interfering terminal or interfering gateway, the gain (e.g., G/T) of the satallite's receive antenna, path loss between the satellite and Earth, and/or crosspol isolation if a cross-pol transmitter or receiver is used. For example, higher EIRPs and higher directivity at the location of the interfering terminal or interfering gateway can result in a higher estimated amount of interference than lower EIRPs and/or lower directivity. In addition, the estimated amount of interference of each interfering terminal or interfering gateway can be based on the distance between the terminal 450-A and the interfering terminal or interfering gateway, e.g., greater distance resulting in less interference.

The estimated amount of interference for each uplink interferer (e.g., interfering terminal or gateway) can be based on, e.g., equal to, an estimated power level of signals transmitted by the uplink interferer at the satellite 140 on the frequency channel of interest. For each transmit frequency channel, the interference compensation value generator 414 can estimate, for each uplink interferer, a power level of signals transmitted by the uplink interferer on the frequency channel at the satellite's receiver using the directional power of the uplink interferer (e.g., the EIRP of the interferer), the directivity of the satellite receive antenna at the location of the uplink interferer, the gain (e.g., G/T) of the satellite's receive antenna, path loss between the satellite and Earth, crosspol isolation if a cross-pol transmitter or receiver is used, and/or the relative locations of the terminal 450-A and the uplink interferer.

In some implementations, the estimated amount of interference for an uplink interferer on a particular frequency channel is based on a combination of the EIRP of the interferer's transmitter, the path loss between the satellite and Earth, the G/T of the satellite's receive antenna, and crosspol isolation (if a cross-pol transmitter or received is used). For example, the estimated amount of interference for an uplink interferer may be equal to a sum of the EIRP and the G/T minus the path loss and the crosspol isolation.

As the estimated amount of interference is determined for each transmit frequency channel of the terminal 450-A, the estimated amount of interference imposed on the return uplink signal transmitted by the terminal 450-A on a particular transmit frequency channel by a particular interferer can be based on the directivity of the satellite receive antenna at the particular transmit frequency channel at the location of the interferer.

The total estimated amount of interference imposed on the return uplink signal for a particular transmit frequency channel can be based on a combination of the estimated amount of interference imposed by each interfering terminal and each interfering gateway. The total estimated amount of interference imposed on the return uplink signal for a particular transmit frequency channel can also be based on noise performance of the satellite receiver. The total interference imposed on the return uplink signal for each transmit frequency channel ($f_k$) of a terminal can be used to determine an estimated SNR for the transmit frequency ($f_k$) using Equation 1 below:

$$\frac{C_{up}}{N_{up}+I_{up}}(f_k) = \frac{C_{up}(f_k)}{N_{up}(f_k) + \sum_{i=1}^{N} I_{gw,up}(i, f_k) + \sum_{j=1}^{M} I_{term,up}(j, f_k)} \quad \text{Equation 1}$$

In Equation 1, $$\frac{C_{up}}{N_{up}+I_{up}}(f_k)$$

is the uplink SNR for frequency ($f_k$); $C_{up}(f_k)$ is the carrier power per unit bandwidth at frequency ($f_k$); $N_{up}(f_k)$ is the noise power per unit bandwidth at the satellite receiver at frequency ($f_k$); $I_{gw,up}(i,f_k)$ is the interfering gateway power per unit bandwidth from gateway (i) at the satellite at frequency ($f_k$) and $I_{term,up}(j, f_k)$ is the interfering terminal power per unit bandwidth from terminal (j) at the satellite at frequency ($f_k$). In this equation, there are "N" gateways that transmit on frequency channel ($f_k$) and "M" terminals that transmit on frequency channel ($f_k$). Thus, the SNR for frequency ($f_k$) is based on a ratio between (i) the carrier power per unit bandwidth at frequency ($f_k$) and (ii) a combination of the noise power per unit bandwidth at the satellite at frequency ($f_k$), a sum of the gateway interfering power per unit bandwidth of the interfering gateways at frequency ($f_k$) and a sum of the terminal interfering power per unit bandwidth of the interfering terminals at frequency ($f_k$).

For the return downlink signal transmitted by the satellite to the gateway in response to the return uplink signal transmitted by the terminal 450-A to the satellite, the estimated amount of interference imposed by each interfering terminal or interfering gateway can be based on the performance data for the receive antenna of the interfering terminal or interfering gateway, e.g., the G/T of the antenna, and the directivity of the satellite transmit antenna at the location of the interfering terminal or interfering gateway. In addition, the estimated amount of interference of each interfering terminal or interfering gateway can be based on the distance between the terminal 450-A and the interfering terminal or interfering gateway, e.g., greater distance resulting in less interference.

The estimated amount of interference for each downlink interferer (e.g., satellite transmissions to an interfering terminal or gateway) can be based on, e.g., equal to, an estimated power level of signals transmitted by the satellite to the downlink interferer at the gateway for which interference compensation values are being determined on the frequency channel of interest. For each transmit frequency channel, the interference compensation value generator 414 can estimate, for each downlink interferer, a power level of signals transmitted by the satellite on the frequency channel at the gateway's receiver using the performance data for the receive antenna of the interfering terminal or interfering gateway, e.g., the G/T of the antenna, the directivity of the satellite transmit antenna at the location of the interfering terminal or interfering gateway, the EIRP of the satellite's transmitter, the distance between the gateway and the interfering terminal or interfering gateway and/or crosspol isolation if a cross-pol transmitter or receiver is used.

In some implementations, the estimated amount of interference for a downlink interferer on a particular frequency channel is based on a combination of the EIRP of the satellite's transmitter, the path loss between the satellite and Earth, the G/T of the gateway's receive antenna, and crosspol isolation (if a cross-pol transmitter or received is used). For example, the estimated amount of interference for downlink interferer may be equal to a sum of the EIRP and the G/T minus the path loss and the crosspol isolation.

As the estimated amount of interference is determined for each transmit frequency channel of the terminal 450-A, the estimated amount of interference imposed on the return downlink signal on a particular transmit frequency channel by a particular interferer can be based on the directivity of the satellite transmit antenna at the particular transmit frequency channel at the location of the interferer.

The total estimated amount of interference imposed on the return downlink signal for a particular transmit frequency channel can be based on a combination of the estimated amount of interference imposed by satellite transmissions to each interfering terminal and each interfering gateway. The total estimated amount of interference imposed on the return downlink signal for a particular transmit frequency channel can also be based on noise performance of the gateway receiver for the gateway that receives data from the terminal (e.g., gateway 150). The total interference imposed on the return downlink signal for each transmit frequency channel ($f_k$) of a terminal can be used to determine an estimated SNR for the transmit frequency ($f_k$) using Equation 2 below:

$$\frac{C_{dwn}}{N_{dwn}+I_{dwn}}(f_k) = \frac{C_{dwn}(f_k)}{N_{dwn}(f_k) + \sum_{i=1}^{N} I_{gw,dwn}(i, f_k) + \sum_{j=1}^{M} I_{term,dwn}(j, f_k)} \quad \text{Equation 2}$$

In Equation 2, $$\frac{C_{dwn}}{N_{dwn}+I_{dwn}}(f_k)$$

is the downlink SNR for frequency ($f_k$); $C_{dwn}(f_k)$ is the carrier power per unit bandwidth at frequency ($f_k$); $N_{dwn}(f_k)$ is the noise power per unit bandwidth at the gateway receiver at frequency ($f_k$) $I_{gw,dwn}(i, f_k)$ is the portion of satellite power to gateway (i) per unit bandwidth at the receiver of victim gateway (e.g., gateway 150) at frequency ($f_k$) and $I_{term,dwn}(j, f_k)$ is the portion of satellite power to terminal (j) per unit bandwidth at the receiver of the victim gateway at frequency ($f_k$). In this equation, there are "N" other gateways that receive satellite signals on frequency channel ($f_k$) and "M" terminals that receive satellite signals on frequency channel ($f_k$). Thus, the SNR for frequency ($f_k$) is based on a ratio between (i) the carrier power per unit bandwidth at frequency ($f_k$) and (ii) a combination of the noise power per unit bandwidth at the gateway at frequency ($f_k$), a sum of the interfering power per unit bandwidth meant for other gateways at frequency ($f_k$) and a sum of the interfering power per unit bandwidth meant for terminals at frequency ($f_k$).

The interference compensation value generator 414 can determine an estimated total path SNR for each transmit frequency channel of each terminal 450-A-450-Z based on a combination of the estimated SNRs for the transmit frequency channel of the terminal determined using Equations 1 and 2. Combining Equations 1 and 2, Equation 3 below can be used to determine the estimated total path SNR for a transmit frequency channel of a satellite terminal:

$$\frac{C}{N+1}(f_k) = \frac{1}{\left(\frac{1}{\frac{C_{dwn}}{(N_{dwn}+I_{dwn})}(f_k)} + \frac{1}{\frac{C_{up}}{(N_{up}+I_{up})}(f_k)}\right)} \quad \text{Equation 3}$$

In Equation 3, $$\frac{C}{N+1}(f_k)$$

is the estimated total path SNR for frequency channel ($f_k$); $C_{dwn}$ is the carrier power per unit bandwidth at frequency ($f_k$); $N_{dwn}$ is the noise power per unit bandwidth at the gateway receiver at frequency ($f_k$); $I_{dwn}$ is the total estimated downlink interference imposed by the satellite terminals at frequency ($f_k$); $N_{up}$ is the noise power per unit bandwidth at the satellite receiver at frequency ($f_k$); and $I_{up}$ is the total estimated uplink interference imposed by the interfering gateways and the interfering terminals at frequency ($f_k$);

For each terminal 450-A-450-Z, the interference compensation value generator 414 can determine the estimated total path SNR at each transmit channel frequency of the terminal using Equations 1-3 above and the data collected by the data collector 412. The interference compensation value generator 414 can use the estimated total path SNRs for the terminal to determine the interference compensation values for the terminal.

In some implementations, the interference compensation value generator 414 normalizes the estimated total path SNRs to determine the interference compensation values. The interference compensation value generator 414 can normalize the estimated total path SNRs for the terminal using the estimated total path SNRs for a particular beam on which the terminal will be transmitting or all beams of the satellite system. For example, the interference compensation value generator 414 can determine estimated total path SNRs for only the transmit frequency channels on which the terminal is configured to transmit or for all transmit frequency channels available to the satellite system of which the terminal is a part.

The interference compensation value generator 414 can normalize the estimated total path SNRs using one of the estimated total path SNRs. For example, the interference compensation value generator 414 can normalize the estimated total path SNRs using the highest estimated total path SNR or the lowest estimated total path SNR. For example, consider a terminal that communicates on three transmit frequency channels A, B, and C. The estimated total path SNR for channel A may be 37 dB; the estimated total path SNR for channel B may be 41 dB; and the estimated total path SNR for channel C may be 28 dB. In this example, the estimated total path SNR for channel B may be used to normalize the three estimated total path SNRs as channel B has the highest estimated total path SNR. To normalize the estimated total path SNRs, the interference compensation value generator 414 can determine the difference between the estimated total path SNR for channel B and the estimated path for the channel. In this example, the normalized interference compensation value for channel A may be 4 dB (41-37). Similarly, the normalized interference compensation value for channel B may be 0 dB (41-41) and the normalized interference compensation value for channel C may be 13 dB (41-28).

The interference compensation value generator 414 can generate the interference compensation values for each terminal 450-A-450-Z and provide the values to the table generator 416. The table generator 416 can generate, for each terminal, an interference compensation table that includes the interference compensation values for the terminal. The table generator 416 can provide each interference compensation table to its corresponding terminal. For example, the table generator 416 can provide the interference compensation tables to a gateway that transmits the interference compensation tables to their corresponding terminals.

The interference compensation table generator 410 can update the tables, e.g., in response to a change to the satellite system. For example, if a new gateway or terminal is added to the system, this may add a new interferer for at least some of the frequency channels. In another example, the satellite or a terminal or gateway may be configured to transmit or receive on a frequency channel on which it previously did not transmit, adding a new interfere to that frequency channel. The interference compensation value generator 414 can determined updated interference compensation values and the table generator 416 can generate updated interference compensation tables based on the updated values. The table generator 416 can provide the updated interference compensation tables to the terminals 450-A-450-D, e.g., via the gateway.

The interference compensation table generator 410 can determine interference compensation values and generate interference compensation tables for gateways in a similar manner and using the same or similar data. For example, the interference compensation value generator 414 can use equation 3 above to determine an estimated total path SNR for each transmit frequency channel of the gateway and normalize the values to generate the interference compensation values for the gateway.

The total path SNR for each frequency channel can be based on a combination of the estimated power level at the satellite's receiver of each forward uplink interferer on the frequency channel and the estimated power level at the terminal of each forward downlink interferer on the frequency channel. The estimated power level at the satellite's receiver for a forward uplink interferer can be based on directional power of the uplink interferer (e.g., the EIRP of the interferer), the directivity of the satellite receive antenna at the location of the uplink interferer, and the relative locations of the gateway and the uplink interferer. The estimated power level at the terminal's receiver for a forward downlink interferer can be based on the performance data for the receive antenna of the interfering terminal or interfering gateway, e.g., the G/T of the antenna, the directivity of the satellite transmit antenna at the location of the interfering terminal or interfering gateway, and/or the distance between the gateway and the interfering terminal or interfering gateway.

Figure 5:
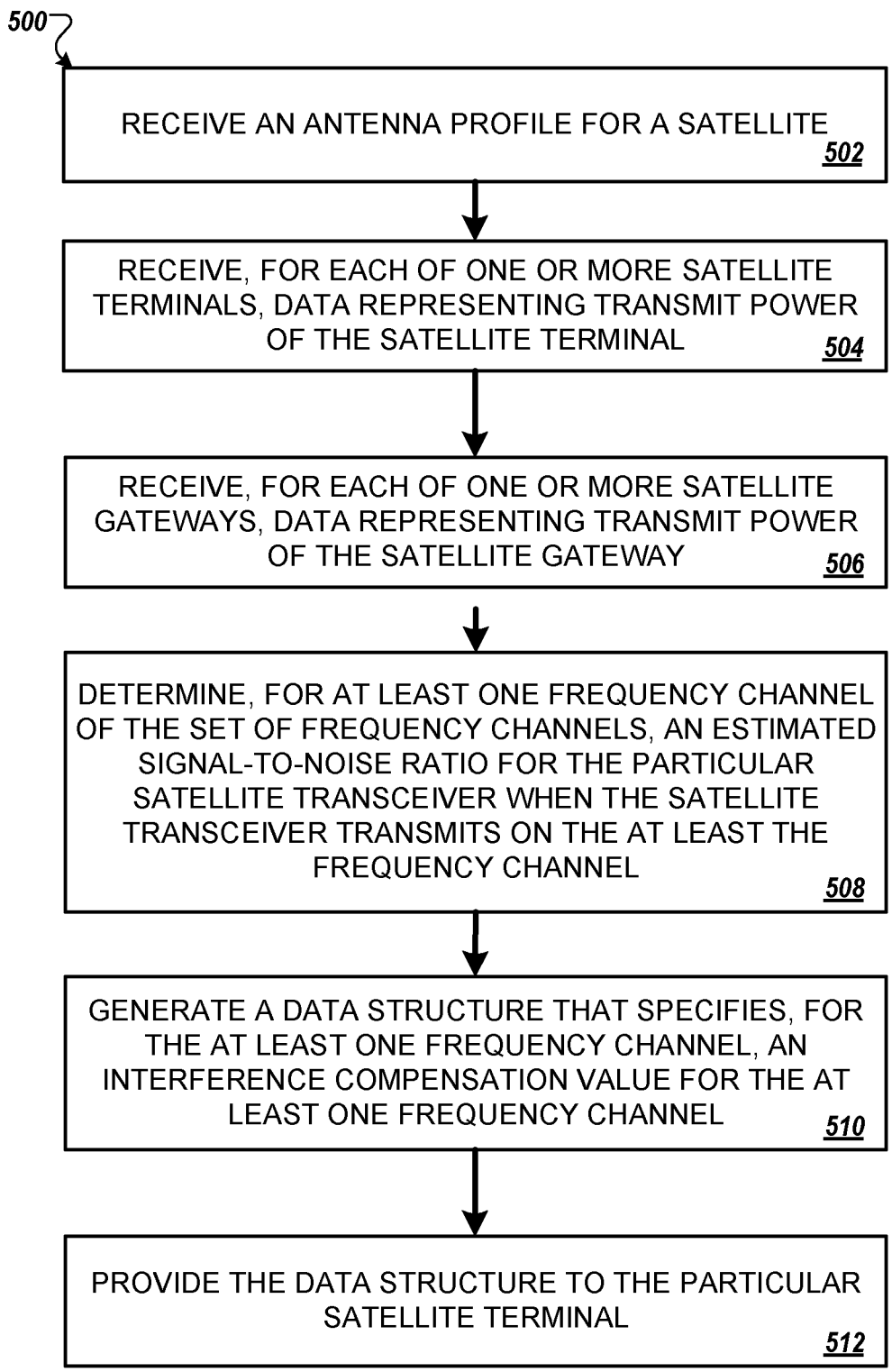
FIG. 5 is a flow diagram that illustrates an example process for generating a data structure that include interference compensation values for a particular satellite terminal.

FIG. 5 is a flow diagram that illustrates an example process 500 for generating a data structure that includes interference compensation values for a particular satellite terminal. The process may be performed by a system that includes one or more computers. The one or more computers can include one or more processors. The one or more computers can also include one or more data storage devices storing instructions that, when executed, cause the one or more computers to perform the actions of the process 500. The steps of the process 500 may be performed in the order shown in FIG. 5, or in another order. A similar process can be used to generate a data structure that includes interference compensation values for a particular satellite gateway.

In step (502), an antenna profile for a satellite is received. The antenna profile can include data representing a power level of satellite signals transmitted by the satellite at multiple locations. The antenna profile can also include data representing a power of satellite signals received by the satellite from multiple locations. The antenna profile may be received from a manufacturer or an operator of the satellite.

In step (504), data for each of one or more satellite terminals is received. The one or more satellite terminals may be satellite terminals that are part of the same satellite communication system as the particular satellite terminal and/or that communicate on the same transmit frequency channels as the particular satellite terminal.

The data for each terminal can represent transmit power of the satellite terminal at each frequency channel of a set of frequency channels on which a particular satellite terminal is configured to transmit. The data for each satellite terminal can also include the geographic location of the terminal, the frequency channels on which the terminal transmits and/or receives data, data specifying the directional power of the terminal when the terminal is transmitting data, and/or performance data for the terminal's antenna. In some implementations, the directional power of the terminal may be expressed as the EIRP of the terminal. In some implementations, the performance data for the terminal's antenna is expressed as the G/T of the antenna.

In step (506), data for each of one or more satellite gateways is received. The one or more satellite terminals may be satellite gateways that are part of the same satellite communication system as the particular satellite terminal and/or that communicate on the same transmit frequency channels as the particular satellite terminal.

The data for each gateway can represent the transmit power of the satellite gateway at each frequency channel of the set of frequency channels. The data for each gateway can also include the geographic location of the gateway, the frequency channels on which the gateway transmits and/or receives data, data specifying the directional power of the gateway when the gateway is transmitting data, and/or performance data for the gateway's antenna. In some implementations, the directional power of the gateway may be expressed as the EIRP of the gateway. In some implementations, the performance data for the gateway's antenna is expresses as G/T of the antenna.

In step (508), for at least one frequency channel for the set of frequency channels, an estimated SNR is determined for the particular satellite terminal when the satellite terminal transmits on the at least one the frequency channel. For example, the estimated SNR for a particular frequency channel can be an estimated total path SNR that is based on estimated interference imposed on the particular satellite terminal's transmissions on the particular frequency channel. The estimated SNR for a frequency channel can be based on the antenna profile for the satellite, the data received for each satellite terminal, and the data received for each satellite gateway, as described above.

In step (510), a data structure is generated. The data structure, which may be a table, can specify, for the at least one frequency channel of the set of frequency channels, an interference compensation value for the at least one frequency channel. The interference compensation value for a particular frequency channel can be based on a difference between the SNR for a particular frequency channel of the set of frequency channels and the signal-to-noise ratio for the particular frequency channel. For example, the interference compensation value for a particular frequency channel can be based on a difference between the highest SNR of the set of frequency channels and the SNR for the particular frequency channel.

In step (512), the data structure is provided to the particular satellite terminal. For example, a gateway with which the particular satellite terminal communicates may send the data structure to the particular satellite terminal. The satellite terminal can use the interference compensation values stored in the data structure to adjust its transmit power level based on the transmit frequency channel to which the particular satellite terminal is assigned.

Figure 6:
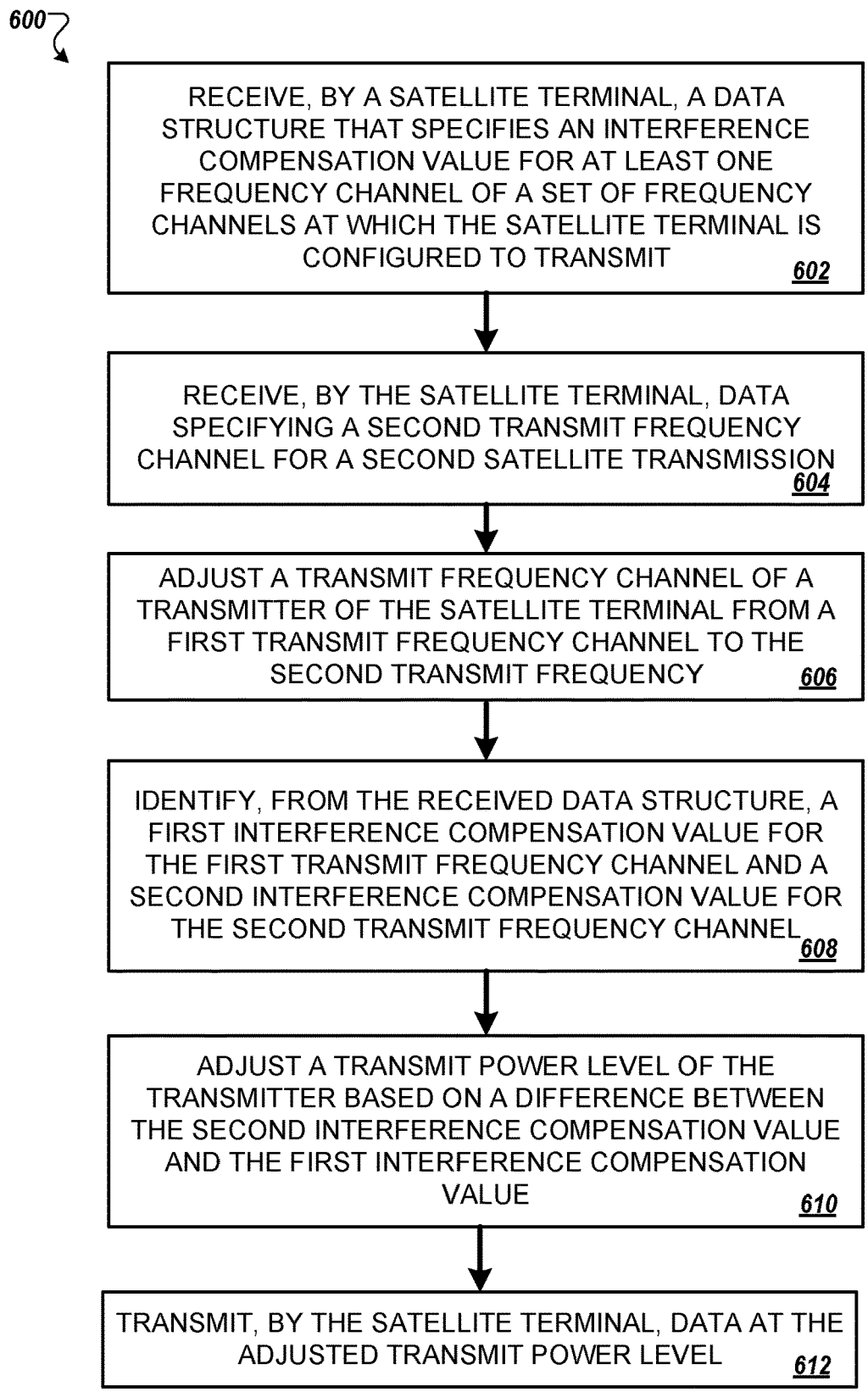
FIG. 6 is a flow diagram that illustrates an example process for adjusting transmit power of a satellite terminal and transmitting data at the adjusted transmit power.

FIG. 6 is a flow diagram that illustrates an example process 600 for adjusting transmit power of a satellite terminal and transmitting data at the adjusted transmit power. The process 600 may be performed by a satellite terminal, such as the satellite terminal 110 of FIG. 1. The satellite terminal may include one or more processors. The satellite terminal may also include one or more data storage devices storing instructions that, when executed, cause the satellite terminal to perform the actions of the process 600. The steps of the process 600 may be performed in the order shown in FIG. 6, or in another order. A similar process can be used to adjust the transmit power of a satellite gateway.

In step (602), the satellite terminal receives a data structure that specifies an interference compensation value for at least one frequency channel of a set of frequency channels at which the satellite terminal is configured to transmit. For example, the terminal may be part of a DAMA system in which the terminal transmits on an assigned transmit frequency channel for each data transmission and the assigned transmit frequency channel may be different for different data transmissions. The data structure can include an interference compensation table that stores the interference compensation values. The satellite terminal can store the data structure in memory of the satellite terminal, e.g., in a hard drive, flash drive, or other type of data storage device.

As described above, the interference compensation value for the at least one transmit frequency channel can be based on estimated interference imposed on satellite transmissions transmitted by the satellite terminal on the particular transmit frequency channel. In some implementations, the interference compensation value for a transmit frequency channel can be based on a total path SNR for the transmit frequency channel. For example, the interference compensation value for a particular transmit frequency channel can be based on (e.g., equal to or proportional to) a difference between a total path SNR for a transmit frequency channel having the highest SNR of the transmit frequency channels and the total path SNR for the particular transmit frequency channel. The interference compensation value for each transmit frequency channel can be expressed in decibels as the SNRs may also be expressed in decibels.

At step (604), the satellite terminal receives data specifying a second transmit frequency channel for a second satellite transmission. For example, the satellite terminal may have transmitted data on a first transmit frequency channel. After some time, the satellite terminal can receive a request to transmit additional data. The satellite terminal can request, e.g., from a satellite gateway, a transmit frequency channel to use for transmitting the additional data. The satellite gateway can provide, to the satellite terminal, data specifying the second transmit frequency channel on which the satellite terminal can transmit the additional data. In this example, the first transmit frequency channel may be referred to as a previous transmit frequency channel for a previous transmission and the second transmit frequency channel may be referred to as a next transmit frequency channel for a next transmission. The second transmit frequency channel may be used immediately after the first transmit frequency channel, e.g., with no intervening transmit frequency channels or there may be one or more intervening transmit frequency channels used between the first and second transmit frequency channels.

At step (606), the satellite terminal adjusts a transmit frequency channel of a transmitter of the satellite terminal from the first transmit frequency channel to the second transmit frequency. The satellite terminal can include a tuner that adjusts the transmit frequency channel of the transmitter from the first transmit frequency channel to the second transmit frequency channel specified by the data received from the satellite gateway.

At step (608), the satellite terminal identifies, from the received data structure, a first interference compensation value for the first transmit frequency channel and a second interference compensation value for the second transmit frequency channel. For example, the satellite terminal can access an interference compensation table and identify the interference compensation values for the first transmit frequency channel and the second transmit frequency channel.

At step (610), the satellite terminal adjusts a transmit power level of the transmitter based on a difference between the second interference compensation value and the first interference compensation value. In some implementations, the adjusted power level is based on a first transmit power level used to transmit on the first transmit frequency channel and a difference between the first interference compensation value and the second interference compensation value. For example, the adjusted power level is based on (e.g., equal to or proportional to) a sum of the first transmit power level used to transmit on the first transmit frequency channel and the difference between the second interference compensation value and the first interference compensation value. The adjusted power level can be based on an increase or decrease in transmit power that would provide similar signal quality on the second transmit frequency channel as was provided on the first transmit frequency channel in view of the difference in estimated interference for the two transmit frequency channels.

At step (612), the satellite terminal transmits data at the adjusted transmit power level. For example, the transmitter can use an antenna to transmit the data on the second transmit frequency channel and at the adjusted power level. The satellite terminal can transmit the data to a satellite on a return uplink signal that is on the second transmit frequency channel. The satellite can receive the data and transmit the data to the satellite gateway.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method comprising:
   receiving, by a satellite transceiver, a data structure that specifies an interference compensation value for at least one transmit frequency channel of a set of frequency channels on which the satellite transceiver is configured to transmit, wherein the interference compensation value for the at least one transmit frequency channel is based on estimated interference imposed on satellite transmissions transmitted by the satellite transceiver on the at least one transmit frequency channel;
   receiving, by the satellite transceiver, data specifying a second transmit frequency channel associated with a second satellite transmission;
   in response to receiving the data specifying the second transmit frequency channel:
      adjusting a transmit frequency channel of a transmitter of the satellite transceiver from a first transmit frequency channel to the second transmit frequency channel;
      identifying, from the received data structure, a first interference compensation value for the first transmit frequency channel and a second interference compensation value for the second transmit frequency channel; and
      adjusting a transmit power level of the transmitter of the satellite transceiver based on a difference between the second interference compensation value and the first interference compensation value; and
   transmitting, by the satellite transceiver, data at the adjusted transmit power level and on the second transmit frequency channel.

2. The method of claim 1, wherein adjusting the transmit power of the transmitter of the satellite transceiver comprises determining, as the adjusted transmit power, a sum of (i) a first transmit power level used by the transmitter of the satellite transceiver for a first data transmission using the first transmit frequency channel and (ii) the difference between the second interference compensation value and the first interference compensation value.

3. The method of claim 1, wherein the interference compensation value for the at least one transmit frequency channel is based on an estimated total path signal-to-noise ratio for the at least one transmit frequency channel, wherein the total path includes a first signal from the satellite transceiver to a satellite on the at least one transmit frequency channel and a second signal from the satellite to a second satellite transceiver different from the satellite transceiver.

4. The method of claim 3, wherein:
   the satellite transceiver comprises a satellite terminal and the second satellite transceiver comprises a satellite gateway;
   the first signal comprises a return uplink signal; and
   the second signal comprises a return downlink signal.

5. The method of claim 3, wherein:
   the satellite transceiver comprises a satellite gateway and the second satellite transceiver comprises a satellite terminal;
   the first signal comprises a forward uplink signal; and
   the second signal comprises a forward downlink signal.

6. The method of claim 3, wherein the interference compensation value for the at least one transmit frequency channel is based on a difference between (i) an estimated total path signal-to-noise ratio for any one frequency channel of the set of frequency channels and (ii) the estimated total path signal-to-noise ratio for the at least one transmit frequency channel.

7. The method of claim 3, wherein the estimated total path signal-to-noise ratio for the at least one transmit frequency channel is based on estimated interference imposed on signals transmitted by the satellite transceiver on the at least one transmit frequency channel by one or more satellite gateways that transmit on the at least one transmit frequency channel and one or more satellite terminals that transmit on the at least one transmit frequency channel.

8. The method of claim 7, wherein the estimated interference imposed on signals transmitted by the satellite transceiver on the at least one transmit frequency channel by one or more satellite gateways and one or more satellite terminals is based on:
   for each satellite gateway, a directional power of the satellite gateway and directivity of an antenna of the satellite at a location of the satellite gateway; and
   for each different satellite terminal, a directional power of the satellite terminal and directivity of an antenna of the satellite at a location of the satellite terminal.

9. The method of claim 7, wherein the estimated interference imposed on signals transmitted by the satellite transceiver on the at least one frequency channel by one or more a satellite gateways and one or more different satellite terminals is based on:
   for each satellite gateway, performance data for an antenna of the satellite gateway and directivity of an antenna of the satellite; and
   for each different satellite terminal, performance data for an antenna of the different satellite terminal and directivity of an antenna of the satellite.

10. The method of claim 1, further comprising receiving updated interference compensation values and using the updated interference compensation values to adjust the transmit power of the transmitter of the satellite transceiver, wherein the updated interference compensation values are based on a change to a satellite system that includes the satellite transceiver.

11. The method of claim 10, wherein the change to the satellite system includes an addition or removal of at least one of (i) a satellite terminal, (ii) a satellite gateway, or (iii) a portion of the channels of which signals are being transmitted by terminals or gateways of the satellite system.

12. The method of claim 1, wherein the data structure specifies a respective interference compensation value for each transmit frequency channel on which the satellite transceiver is configured to transmit and the second satellite transmission is subsequent to a first satellite transmission by the satellite transceiver on the first transmit frequency channel.

13. A transceiver of a satellite communications system, the transceiver comprising:
one or more processors;
a transmitter; and
one or more data storage devices storing instructions that, when executed by the one or more processors, cause the transmitter to perform operations comprising:
receiving a data structure that specifies an interference compensation value for at least one transmit frequency channel of a set of frequency channels on which the transmitter is configured to transmit, wherein the interference compensation value for the at least one transmit frequency channel is based on estimated interference imposed on satellite transmissions transmitted by the transmitter on the at least one transmit frequency channel;
receiving data specifying a second transmit frequency channel associated with a second satellite transmission;
in response to receiving the data specifying the second transmit frequency channel:
adjusting a transmit frequency channel of the transmitter from a first transmit frequency channel to the second transmit frequency channel;
identifying, from the received data structure, a first interference compensation value for the first transmit frequency channel and a second interference compensation value for the second transmit frequency channel; and
adjusting a transmit power level of the transmitter based on a difference between the second interference compensation value and the first interference compensation value; and
transmitting data at the adjusted transmit power level and on the next transmit frequency channel.

14. The transceiver of claim 13, wherein adjusting the transmit power of the transmitter comprises determining, as the adjusted transmit power, a sum of (i) a first transmit power level used by the transmitter for a first data transmission using the first transmit frequency channel and (ii) the difference between the second interference compensation value and the first interference compensation value.

15. The transceiver of claim 13, wherein the interference compensation value for the at least one transmit frequency channel is based on an estimated total path signal-to-noise ratio for the at least one transmit frequency channel, wherein the total path includes a first signal from the transceiver to a satellite on the at least one transmit frequency channel and a second signal from the satellite to a second transceiver different from the satellite transceiver.

16. A method comprising:
receiving, by one or more computers, an antenna profile for a satellite, the antenna profile representing a power level of satellite signals at a plurality of locations;
receiving, by the one or more computers and for each of one or more satellite terminals, data representing transmit power of the satellite terminal at each frequency channel of a set of frequency channels on which a particular satellite transceiver is configured to transmit;
receiving, by the one or more computers and for each of one or more satellite gateways, data representing transmit power of the satellite gateway at each frequency channel of the set of frequency channels;
determining, by the one or more computers and for at least one frequency channel of the set of frequency channels, an estimated signal-to-noise ratio for the particular satellite transceiver when the particular satellite transceiver transmits at the frequency channel based on the antenna profile for the satellite, the data received for each satellite terminal and the data received for each satellite gateway;
generating, by the one or more computers, a data structure that specifies, for the at least one frequency channel of the set of frequency channels, an interference compensation value for the at least one frequency channel, wherein the interference compensation value for the at least one frequency channel is based on a difference between the signal-to-noise ratio for a particular frequency channel of the set of frequency channels and the signal-to-noise ratio for the at least one frequency channel; and
providing the data structure to the particular satellite transceiver.

17. The method of claim 16, wherein the particular frequency channel is the frequency channel of the set of frequency channels having the greatest signal-to-noise ratio of the set of frequency channels.

18. The method of claim 16, wherein the estimated signal-to-noise ratio for the particular satellite transceiver when the particular satellite transceiver transmits at each particular frequency channel is further based on a location of each of the one or more satellite terminals and a location of each of the one or more satellite gateways.

19. The method of claim 16, wherein the estimated signal-to-noise ratio for the particular satellite transceiver when the particular satellite transceiver transmits at each particular frequency channel is further based on performance data for a respective antenna of each of the one or more satellite terminals and performance data for a respective antenna of each of the one or more satellite gateways.

20. The method of claim 16, wherein the signal-to-noise ratio for the particular frequency channel is the signal-to-noise ratio for a frequency channel having the highest signal-to-noise ratio of the set of frequency channels.

* * * * *

UNITED STATES PATENT AND TRADEMARK OFFICE
CERTIFICATE OF CORRECTION

PATENT NO. : 10,298,315 B2
APPLICATION NO. : 15/639538
DATED : May 21, 2019
INVENTOR(S) : Murali Regunathan and Yezdi Antia Page 1 of 1

It is certified that error appears in the above-identified patent and that said Letters Patent is hereby corrected as shown below:

On the Title Page

Column 1, (Title), Line 3 (Approx.), delete "COMMUNICATON" and insert
-- COMMUNICATION --, therefor.

In the Specification

Column 1, Line 3, delete "COMMUNICATON" and insert -- COMMUNICATION --, therefor.

In the Claims

In Claim 9, Column 24, Line 53, delete "more a" and insert -- more --, therefor.

Signed and Sealed this
Sixteenth Day of July, 2019

Andrei Iancu
*Director of the United States Patent and Trademark Office*